US 6,735,553 B1

(12) United States Patent
Frogner et al.

(10) Patent No.: US 6,735,553 B1
(45) Date of Patent: May 11, 2004

(54) USE OF MODEL CALIBRATION TO ACHIEVE HIGH ACCURACY IN ANALYSIS OF COMPUTER NETWORKS

(75) Inventors: Bjorn Frogner, San Carlos, CA (US); Sergio Guarro, Redondo Beach, CA (US); Guy Scharf, Mountain View, CA (US)

(73) Assignee: NetPredict, Inc., Menlo Park, CA (US)

( * ) Notice: Subject to any disclaimer, the term of this patent is extended or adjusted under 35 U.S.C. 154(b) by 78 days.

(21) Appl. No.: 10/031,751
(22) PCT Filed: Jul. 13, 2000
(86) PCT No.: PCT/US00/19235
§ 371 (c)(1), (2), (4) Date: Jan. 18, 2002
(87) PCT Pub. No.: WO01/06415
PCT Pub. Date: Jan. 25, 2001

(51) Int. Cl.[7] .................................................. G06F 11/30
(52) U.S. Cl. ...................................... 702/186; 370/469
(58) Field of Search ........................ 702/186; 370/469, 370/232; 700/1; 709/236

(56) References Cited

U.S. PATENT DOCUMENTS

| | | | |
|---|---|---|---|
| 5,179,549 A | * | 1/1993 | Joos et al. ................... 370/232 |
| 6,115,393 A | * | 9/2000 | Engel et al. ................. 370/469 |
| 6,243,610 B1 | * | 6/2001 | Iino et al. ...................... 700/1 |
| 2001/0037402 A1 | * | 11/2001 | Schneider ................... 709/236 |

* cited by examiner

Primary Examiner—John Barlow
Assistant Examiner—Xiuqin Sun
(74) Attorney, Agent, or Firm—Carr & Ferrell LLP (57) ABSTRACT

A system and method are provided for creating a network performance prediction model, and calibrating the prediction model, through application of network load statistical analyses. The method includes characterizing the measured load on the network, which may include background load data obtained over time, and may further include directed load data representative of a transaction-level event. Probabilistic representations of load data are derived to characterize the statistical persistence of the network performance variability and to determine delays throughout the network. The probabilistic representations are applied to the network performance prediction model to adapt the model for accurate prediction of network performance. Certain embodiments of the method and system may be used for analysis of the performance of a distributed application characterized as data packet streams.

20 Claims, 6 Drawing Sheets

| Name | % Load | % Time | Total sec | Latency sec | Propagate sec | Bandwidth sec | Processing sec | Dynamic Delay |
|---|---|---|---|---|---|---|---|---|
| Server .200 | 0 | 0 | 0.116 | 0.116 | 0 | 0 | 0 | 0 |
| NETWORK-212 | 0 | 0 | 1.858E-3 | 1.858E-3 | 0 | 0 | 0 | 0 |
| Cisco 7513 | 0 | 0 | 0.464 | 0.464 | 0 | 0 | 0 | 0 |
| 3Mb/s DS-3 | 0 | 8 | 4.881 | 0 | 0.036 | 4.845 | 0 | 0 |
| Cisco 7507 | 0 | 0 | 0.013 | 0.012 | 0 | 1.817E-3 | 0 | 0 |
| T1-2 | 75 | 84 | 39.294 | 0 | 0.415 | 9.462 | 0 | 29.416 |
| Cisco 7507 | 0 | 0 | 0.013 | 0.012 | 0 | 1.817E-3 | 0 | 0 |
| T1-8 | 75 | 84 | 37.879 | 0 | 0 | 9.462 | 0 | 28.418 |
| Cisco 7507 | 0 | 0 | 0.095 | 0.093 | 0 | 1.817E-3 | 0 | 0 |
| NETWORK-380 | 0 | 0 | 1.858E-3 | 1.855E-3 | 0 | 0 | 0 | 0 |
| .68 station | 0 | 0 | 0.325 | 0.325 | 0 | 0 | 0 | 0 |
| .68 station | 0 | 0 | 0.162 | 0.162 | 0 | 0 | 0 | 0 |
| NETWORK-380 | 0 | 0 | 9.28E-4 | 9.28E-4 | 0 | 0 | 0 | 0 |
| Cisco 7507 | 0 | 0 | 0.046 | 0.046 | 0 | 0 | 0 | 0 |
| T1-8 | 75 | 3 | 1.780 | 0 | 0 | 0.445 | 0 | 1.335 |
| Cisco 7507 | 0 | 0 | 5.885E-3 | 5.800E-3 | 0 | 8.537E-5 | 0 | 0 |
| T1-2 | 75 | 3 | 1.988 | 0 | 0.208 | 0.445 | 0 | 1.335 |
| Cisco 7507 | 0 | 0 | 5.878E-3 | 5.800E-3 | 0 | 7.823E-5 | 0 | 0 |
| 3Mb/s DS-3 | 0 | 0 | 0.246 | 0 | 0.018 | 0.228 | 0 | 0 |
| Cisco 7513 | 0 | 0 | 0.232 | 0.232 | 0 | 7.823E-5 | 0 | 0 |
| NETWORK-212 | 0 | 0 | 9.28E-4 | 9.28E-4 | 0 | 0 | 0 | 0 |
| Server .200 | 0 | 0 | 0.058 | 0.058 | 0 | 0 | 0 | 0 |
| Total Transfer Time | 59.516 | sec. | | at | 14:00:00 | 17 Mar 00 | | |

FIG. 6

USE OF MODEL CALIBRATION TO ACHIEVE HIGH ACCURACY IN ANALYSIS OF COMPUTER NETWORKS

CROSS-REFERENCE TO RELATED APPLICATION

The present application claims the benefit of U.S. provisional Patent Application No. 60/144,450, filed on Jul. 19, 1999 and entitled "Use of Model Calibration to Achieve High Accuracy in Analysis of Computer Networks", which is hereby incorporated by reference.

GOVERNMENT LICENSE RIGHTS

This invention was made with Government support under Grant No. DE-FG03-98ER82626 awarded by the U.S. Department of Energy. The Government has certain rights in this invention.

BACKGROUND

1. Field of the Invention

The present invention relates generally to computer networks, and more particularly to a system and methods for monitoring, analyzing, and predicting network performance.

2. Description of the Prior Art

The evolution in computing from large mainframes to client-server applications to distributed object systems (n-tier systems) has contributed to the need for network performance optimization and system management automation. Generally, this evolution has also contributed to an increased need for knowledge about distributed application transactions occurring within a network.

The performance of distributed applications depends on the performance of the devices along the communication path, such as the end points, connecting network, and intermediate processing nodes. In addition, the application structure, such as the data packet size, sequence, and process logic, can have a substantial effect on the overall application performance, as can the network transmission protocol. As a result of complex interactions between, for example, the protocol and the data packet transmissions, it is difficult to determine the origin of delays affecting the performance of a distributed application.

Different groups generally measure the quality of service of a network differently. For example, service providers tend to measure total latency and packet loss, whereas network managers tend to use test sequences to measure resource availability, variability, delay, and packet loss. Unfortunately, the metrics used by service providers and network managers are not directly meaningful to end users concerned with delays in the interactive events of various distributed applications.

Simulation models for network design and capacity planning have been in existence for many years, but due to their purpose, there is typically minimal measured data available to calibrate these tools. Consequently, the user is required to supply a substantial amount of detail to characterize the network devices and associated loads, and these models are resultantly difficult, and thus costly, to implement, operate, and maintain. Several products currently exist which are based on displaying throughput and connectivity data, and provide reports of measured data collected from the network. This type of data is of little benefit to application end users, who typically want to know why and where the application spends time and what they can do about it.

Most networks operate well under average conditions, however they occasionally, sometimes frequently, experience bursts of traffic from several sources concurrently. Thus, burstiness is an important element of overall network traffic, and there is a need for a network performance analysis system that incorporates measured burstiness into its analysis of operating conditions to establish accurate expectations regarding end-to-end performance of representative application transactions. There is an additional need for a system capable of monitoring actual network performance, comparing that with expected performance, and automatically adapting the network model accordingly. There is a further need for a system that focuses on the needs of end users, and that is capable of addressing hypothetical inquiries from end users. Finally, there is a need for a system that is capable of accurately projecting network performance into the future to facilitate capacity planning.

SUMMARY

The invention generally relates to network performance analysis, modeling, and prediction, and more particularly in relation to the effect of network devices, configuration, transport protocol, and measured loads on distributed applications. An embodiment of the invention comprises characterizing loads on a network, deriving probabilistic distributions representative of the load, and thereby calibrating, or adapting, the network performance model in real-time based on the load distributions.

Embodiments include isolating the network path of interest, and thus the nodes, based on a characterization of the network load either through user input or preferably through sampling real network load data from the network. In the cases where real network data is sampled, a sampling frequency method may be utilized to determine an optimal data sampling frequency based on the network sensitivity and the variability in network load data, which balances the need for data with the burden that the act of sampling has on the network performance.

Embodiments also include steps of decomposing the network load into a background load component that represents the load from all other users of the network, and a directed load component that represents the load due to the application of interest. Further, the background load data is characterized over several different time-scales in order to monitor and analyze the statistical persistence of the load variability. These load decompositions provide a method for characterizing the variability in the load during execution of the application of interest.

Delay distributions for specific nodes in the network at specific times can be derived from the load distributions, and are preferably characterized by a complementary cumulative distribution function. These delay distributions can be superimposed, and can be utilized for making predictions concerning the future network performance according to user-specified parameters, and for responding to hypothetical inquiries from the user.

DETAILED DESCRIPTION OF PREFERRED EMBODIMENTS

Figure 1:
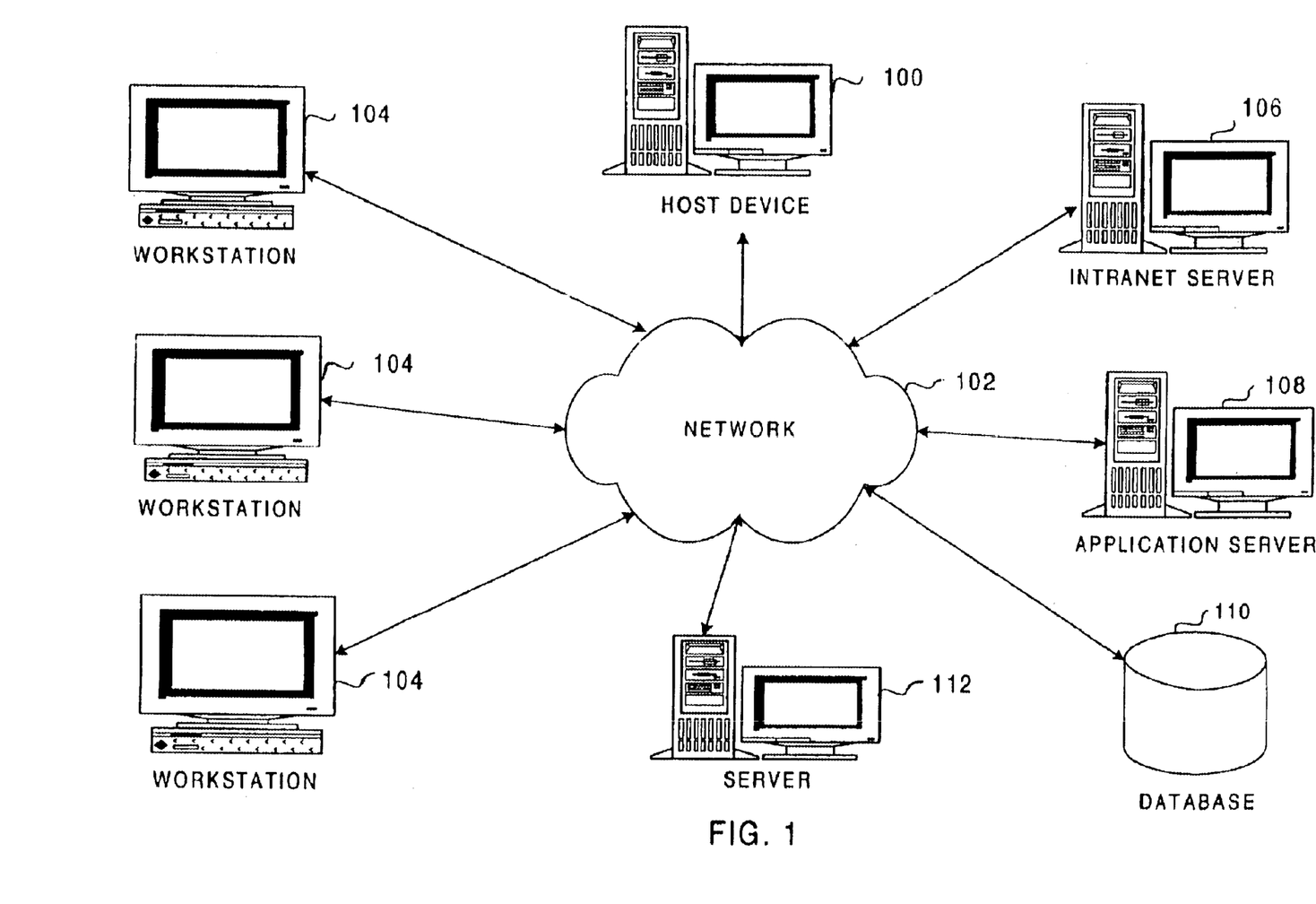
FIG. 1 depicts an exemplary operating environment of a network performance analyzer system operating to perform methods for adaptation of a network performance model, in accordance with an embodiment of the invention.

FIG. 1 depicts an exemplary operating environment of an embodiment of the invention. A network performance analyzer system performing methods for adaptation of a network performance model executes on a host device 100, such as a computer, and is connected to a network 102 to enable communication with other devices. The network 102 may comprise, for example, a LAN such as an Ethernet, or a WAN such as the Internet, connecting a plurality of workstations 104, or computers. Other connected devices may include various servers, for example, an intranet server 106 running software that provides services to other computer programs or other private workstations 104 within an organization. Another example of a connected device is an application server 108 running application software and operating in conjunction with a database 110 to provide services to other workstations 104 connected to a network 102.

A generic server 112 is also depicted to represent any other type of server that may be operating in a network architecture, and thus providing services to any number of workstations 104. Although a preferred embodiment is described as operating within and analyzing a packet-switched network, the invention is not intended to be limited to such a network. Therefore, the exemplary operating environment depicted in FIG. 1 is not intended to limit the network architecture in which the invention is operative, as one skilled in the network art will realize that the system and methods disclosed herein are operable in any network architecture, currently known or unknown.

Figure 2:
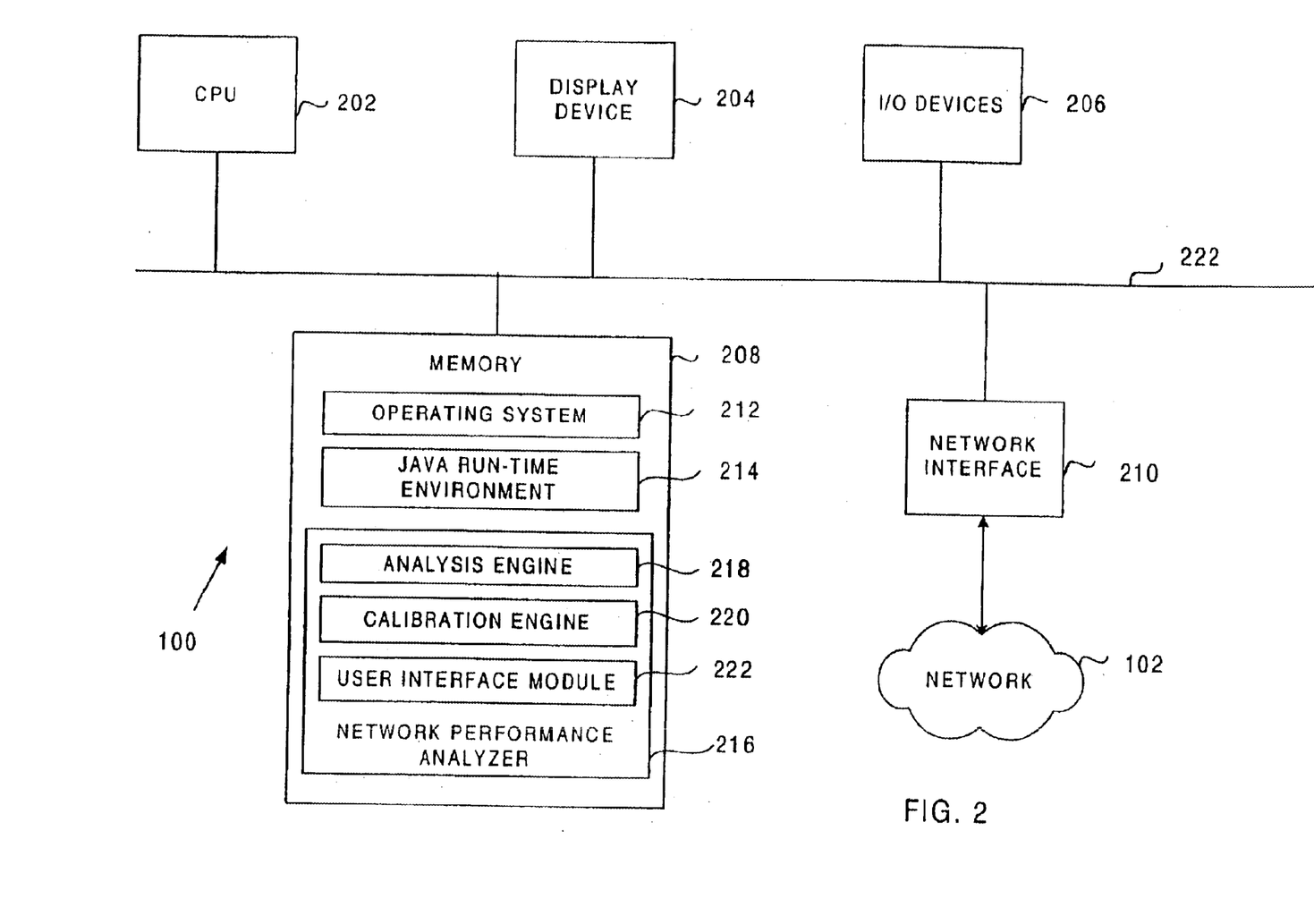
FIG. 2 depicts an exemplary architecture of a host device, on which the network performance analyzer system executes to perform methods for adaptation of a network performance model, in accordance with an embodiment of the present invention.

FIG. 2 depicts an exemplary architecture of the host device 100, or computer, on which the network performance analyzer system executes to perform methods for adaptation of a network performance model, as embodied in the present invention. Host device 100 includes a central processing unit (CPU) 202, such as an Intel Pentium microprocessor, for executing computer program instructions. A display device 204, which may comprise a conventional CRT or LCD monitor, is coupled to a video input/output interface (not shown), such as a video display card, and is configured to display images and text to a user. Miscellaneous input/output devices 206, which may variously comprise printers, keyboards, mice, trackballs, and the like, are operative to receive information from or convey information to a user or another device.

A memory 208, which may include one or a combination of random access memory (RAM), read-only memory (ROM), or non-volatile storage devices such as magnetic hard disks, CD-ROMs, and magneto-optical drives, stores program instructions, files, and other data. A network interface 210, such as an Ethernet card or modem, is provided to enable communication with one or more remote devices over a network 102. The various components of the host device 100 are coupled in communication by at least one bus 222.

As depicted in FIG. 2, the memory 208 stores an operating system 212 for allocating memory, managing communications between host device 100 components, and performing other low-level operations. The memory 208 also stores a Java™ runtime environment (JRE) 214 providing a Java platform on which to run application software written in the Java language. As known in the art, a JRE consists of the Java virtual machine (JVM), the Java platform core classes, and supporting files and is the smallest set of executables and files that constitute the standard Java platform. Although the commercial embodiment of the technology described herein employs the Java programming language and environment, those skilled in the art will recognize that the system and method described herein could be practiced using programming languages with attributes similar to Java which may currently exist or may be developed in the future.

A network performance analyzer 216, including an analysis engine 218, a calibration engine 220, and a user interface module 222 is also stored in the memory 208 of the host device 100. The system and methods described herein are primarily embodied in the network performance analyzer 216. The analysis engine 218 is operative to monitor and predict end-to-end performance of user applications on user-selected paths of the network 102, thereby providing a tool for highly accurate analysis of delays within the network 102. Examples of utilitarian features and benefits of the network performance analyzer 216 include the capabilities to inquire as to how the network will perform in alternate configurations, optimization of network resources among competing users, and comparison of actual versus expected network performance.

Figure 3:
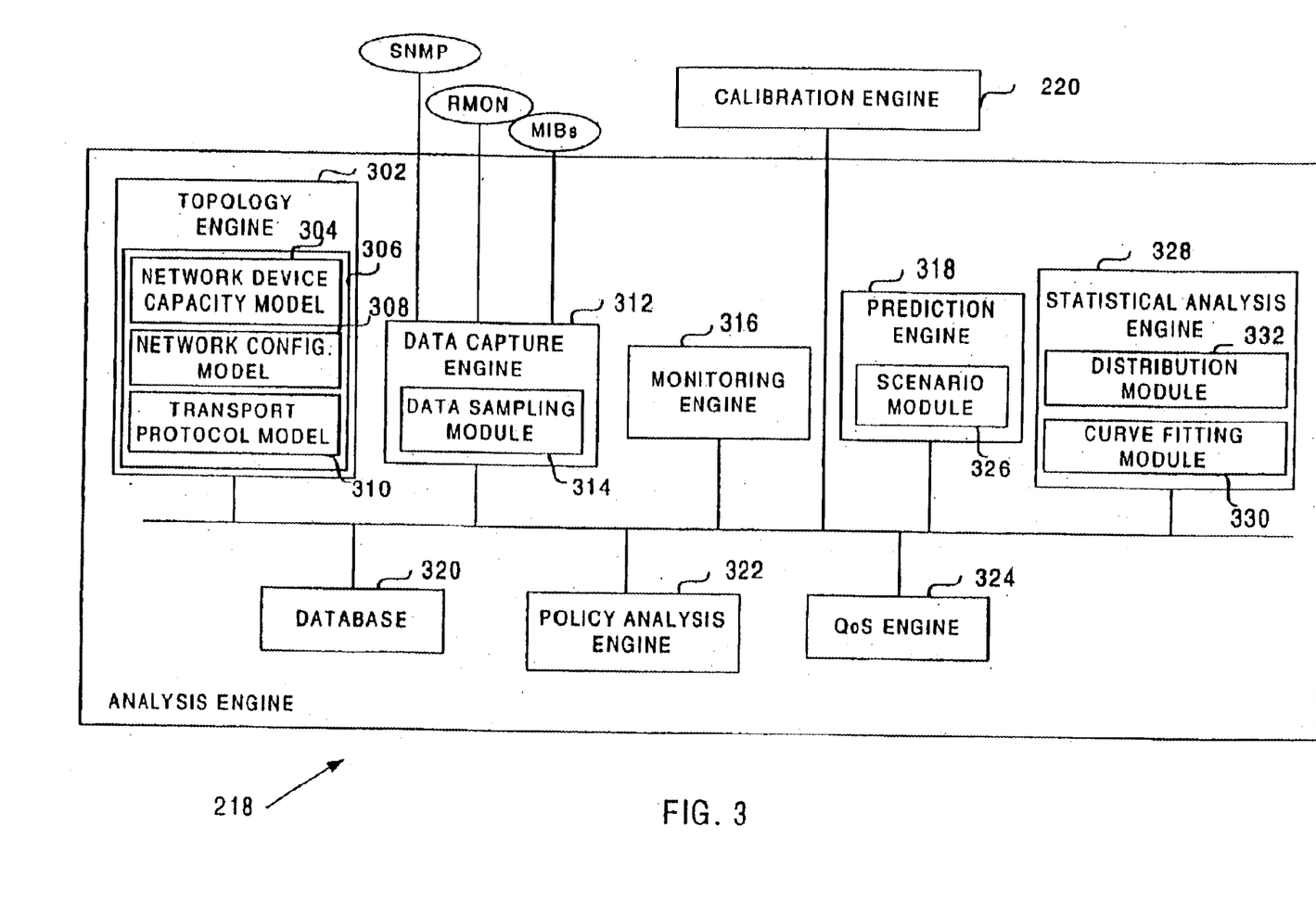
FIG. 3 depicts various functional modules of the analysis engine of the network performance analyzer system performing methods for adaptation of a network performance model, in accordance with an embodiment of the invention.

The calibration engine 220 is operative to adapt, or calibrate, to measured packet transaction data (as described in reference to FIG. 4), a network performance probability distribution function which is utilized by the analysis engine 218, thereby enhancing the accuracy of both the monitoring engine 316 and the prediction engine 318 (see FIG. 3). Generally, this adaptation is performed through the application of statistical analyses of detailed network load data collected over a fine time-scale, thereby minimizing the dependence on network model assumptions. Due to the inherent burstiness (a term used generally to describe the intermittent exchange of data such as data packets in a packet-switched network) of network traffic, there tends to be a significant variability in network performance over time. Thus, a probabilistic analysis of network load at a plurality of time scales is effective in characterizing the statistical persistence desired for accurate modeling of network performance variability.

The user interface module 222 is operative to interact with a user of the network performance analyzer 216, thereby receiving user input for transmission to the analysis engine 218. The user input may include, for example, information describing an exemplary network 102 (FIG. 1) load, specification of application transactions and times of interest, network device and configuration, and other inputs useful to the performance analyzer 216. The user interface module 222 is further operative to transmit different user-specified information to the appropriate engine or module within the network performance analyzer 216.

FIG. 3 depicts the various functional modules of the analysis engine 218. A topology engine 302 is operative to manually create and revise a network model 304 based on prior documentation of the network 102 (FIG. 1), for subsequent analysis of a selected network 102 path. The network model 304 includes a network device capacity model 306, a network configuration model 308, and a transport protocol model 310, which as an integrated whole describe the network 102 in a manner sufficient to perform subsequent analyses thereon.

The network device capacity model 306 is operative to define information about the devices within the network path of interest, such as device identity, bandwidth capacity and IP address. Examples of network devices are bridges, hubs, routers, firewalls, switches, and the like. This information is generally obtainable through existing device documentation, or through an auto-discovery function performed through coordination between the topology engine 302 and a data capture engine 312.

The network configuration model 308 is operative to create links between two or more devices present in the device capacity model 306. These links represent real physical interconnections among the network devices. Examples of links are leased lines (e.g., T1), microwave, PSTN (public switched telephone network), satellite, and the like. Relevant link data may include, for example, transmission line length and bandwidth capacity. Once network devices, capacities, and loads (described below) along a selected path are identified, the behavior of the network protocol, such as TCP (Transmission Control Protocol), HTTP (Hypertext Transfer Protocol), and UDP (User Datagram Protocol), is modeled/simulated by the transport protocol model 310. Examples of aspects of the protocol that are simulated through conventional techniques are ACKing strategy, packet size, receiver window size, and packet re-send rules.

The data capture engine 312 is operative to collect load data from the network 102 (FIG. 1). The network performance analysis engine 218 is operative in multiple modes, such as predictive mode and monitoring mode. In predictive mode, load values over time on key nodes in the selected network 102 (FIG. 1) path may be user-specified and entered into the prediction engine 318, whereas in monitoring mode, the load values are collected from the network 102 by the data capture engine 312 through communication with the monitoring engine 316. The data capture engine 312 collects the load data from conventional sources by sending queries, such as SNMP (Standard Network Management Protocol) queries, to selected nodes in the network 102. The queries may be of, for example, network devices, software agents, or MIBs (management information base).

As a result of the utilization of probability distribution functions to model the network 102 load patterns, the functions, even though persistent, may nevertheless benefit from occasional calibration to measured data to maintain accuracy in predicting future network 102 behavior. In one embodiment, the data capture engine 312 includes a data sampling module 314 for determining an appropriate network 102 (FIG. 1) data sampling frequency for each selected node, to thereby limit the burden upon the network 102 resulting from accessing the network 102 to collect load data. Frequent network load data sampling provides increased accuracy in the statistical characterization of the network 102, at the expense of increased burden on the network 102. Since the performance analysis engine 218 has access to the network model 304, the data sampling module 314 can determine the approximate effect that collection of specific network 102 data of interest, through network queries, will have on the network 102. This effect is defined as the sensitivity of the network 102, and is dependent, for example, on the transmission protocol, the data stream being monitored, and the state of the network 102. Furthermore, since the performance analysis engine 218 has access to an observed variability of the data of interest, based on past network 102 queries, the data sampling module 314 can determine an estimated uncertainty of the data. Thus, given a user-specified desired accuracy of the network 102 load data, the data sampling module 314 is able to calculate an optimal data sampling frequency based on the network 102 sensitivity and the data uncertainty.

The monitoring engine 316 is operative in monitoring the analysis calculations performed by the prediction engine 318. The monitoring engine can receive network 102 (FIG. 1) load data collected by the data capture module 312, the load data preferably being collected every sixty (60) seconds. The monitoring engine 316 cooperates with the curve fitting module 330 and the distribution module 332 of the statistical analysis engine 328, to analyze the load data. The curve fitting module 330 performs conventional curve fitting functions, such as the computation of curve coefficients, based on the collected load data. A complementary cumulative probability distribution function (CCDF), which is described in further detail below, can also be produced by the distribution module 332, based on the collected data.

The monitoring engine 316 is operative to aggregate the 60-second data into hourly data by computing the average and peak loads for a particular hour. From this, a peak-to-average load ratio for particular hours is computable. The monitoring engine further aggregates the collected data into courser time scales, such as daily and weekly. The one-hour time scale is utilized to identify an often recognizable pattern in network load, thus modeling the variability in average network load during typical end-user transactions, whereas the daily and weekly time scales are beneficial in reflecting the repetitive nature of network use during a "standard" workweek.

The monitoring engine 316 is operative to monitor the prediction engine 318 calculations by comparing the collected, or measured, load data with a predicted load probability distribution (which is described in detail below). If the predictive results from the predicted probability distribution tend to diverge substantially from the measured data, the monitoring engine 316 is capable of initiating additional load data collection by the data capture module 312. This additional load data is preferably collected on a second-by-second basis, or fine time-scale, whereby the peak-to-average load ratio can be recomputed based on the fine time-scale data, and stored in database 320. In embodiments, the computed peak-to-average load ratio can be utilized to adapt, or calibrate, the predicted probability distribution through application of the load ratio thereupon.

The prediction engine 318 is operative to predict network 102 (FIG. 1) load and delay conditions at specific nodes for specific times, based on probability distributions based on collected load data. Generally, the prediction engine 318 is capable of receiving load data from the database 320, and receiving load data or prediction queries from the user through the user interface module 222 (FIG. 2), and performing load and delay analyses as described in reference to FIG. 4. The analysis results may include a graphical presentation, such as complementary cumulative probability distribution function (CCDF) which determines the expected delay for a specified percentile (see FIG. 5), or a tabular display which presents delay data associated with each network 102 component in the selected network 102 path (see FIG. 6). The CCDF provides a visual representation of the network 102 delays, and predicts the application transaction delay that may occur in the network 102 for a specified percent of the time. For accurate predictions, both the fixed (e.g., the time it takes a packet to travel a given distance through a link) and variable (e.g., delays due to the burstiness of network traffic) components of the overall network 102 performance are considered. The CCDF also provides the ability to display both fixed and variable delay components in the same graph.

A database 320 is capable of storing the network 102 data collected by the data capture engine 312. The database 320 stores historical data preferably in a relational database, for use in future reporting and review of past performance. A policy analysis engine 322 is operative to compute the optimal allocation of network capacity, based on computations by the prediction engine 318 of estimated application delays due to competition for network resources. A QoS (Quality of Service) engine 324 provides a user of the network performance analyzer 216 a means of specifying the preferred upper bounds on application delays for comparison with results computed by the monitoring engine 316 and the prediction engine 318.

The prediction engine 318 is further equipped with a scenario module 326 to enable the characterization of specific transactions of a distributed application, for end-to-end analysis of the performance of a distributed application executing on the network 102 (FIG. 1). The term "scenario" is used to denote the characterization of specific transactions, for example a database update, in a distributed application. A scenario contains details about the transaction packet stream delineated into a sequence of packets of specified size. The scenario accounts for protocol handshakes, resends, ACKs, client/server internal delays, and the like, and are the building blocks for modeling data streams representing complete application transactions. One method of constructing a packet sequence associated with an application transaction is through use of a conventional LAN analyzer, or a "sniffer", which is a program that captures and analyzes individual data packets on the network 102, while the end user is performing a specific application function of interest on the network 102. Another method is for a user to manually construct a scenario through the user interface module 222 (FIG. 2).

A statistical analysis engine 328 is operative, in conjunction with the monitoring engine 316, to perform the computations necessary to produce CCDF distributions of the collected network 102 load for various time frames. The statistical analysis engine 328 is further operative, in conjunction with the prediction engine 318, to perform at least the following functions: produce predictive CCDF load and delay distributions for the network 102 during a selected time of operation; apply fine time-scale delay CCDF distributions (constructed by network performance calibration engine 220 of FIG. 2) to the scenario model for estimating application transaction packet delays for the selected time; and to display a predictive CCDF for a selected application transaction for the selected time, delineated by network 102 component.

The statistical analysis engine 328 of network performance analysis engine 218 comprises a curve-fitting module 330 employing known techniques for derivation of representative exponential curves from measured data points and computation of coefficients therefrom, and a distribution module 332 for derivation of probabilistic representations, preferably CCDFs, characterizing the background network 102 load and network 102 delays over various time-scales for network 102 components.

Figure 4:
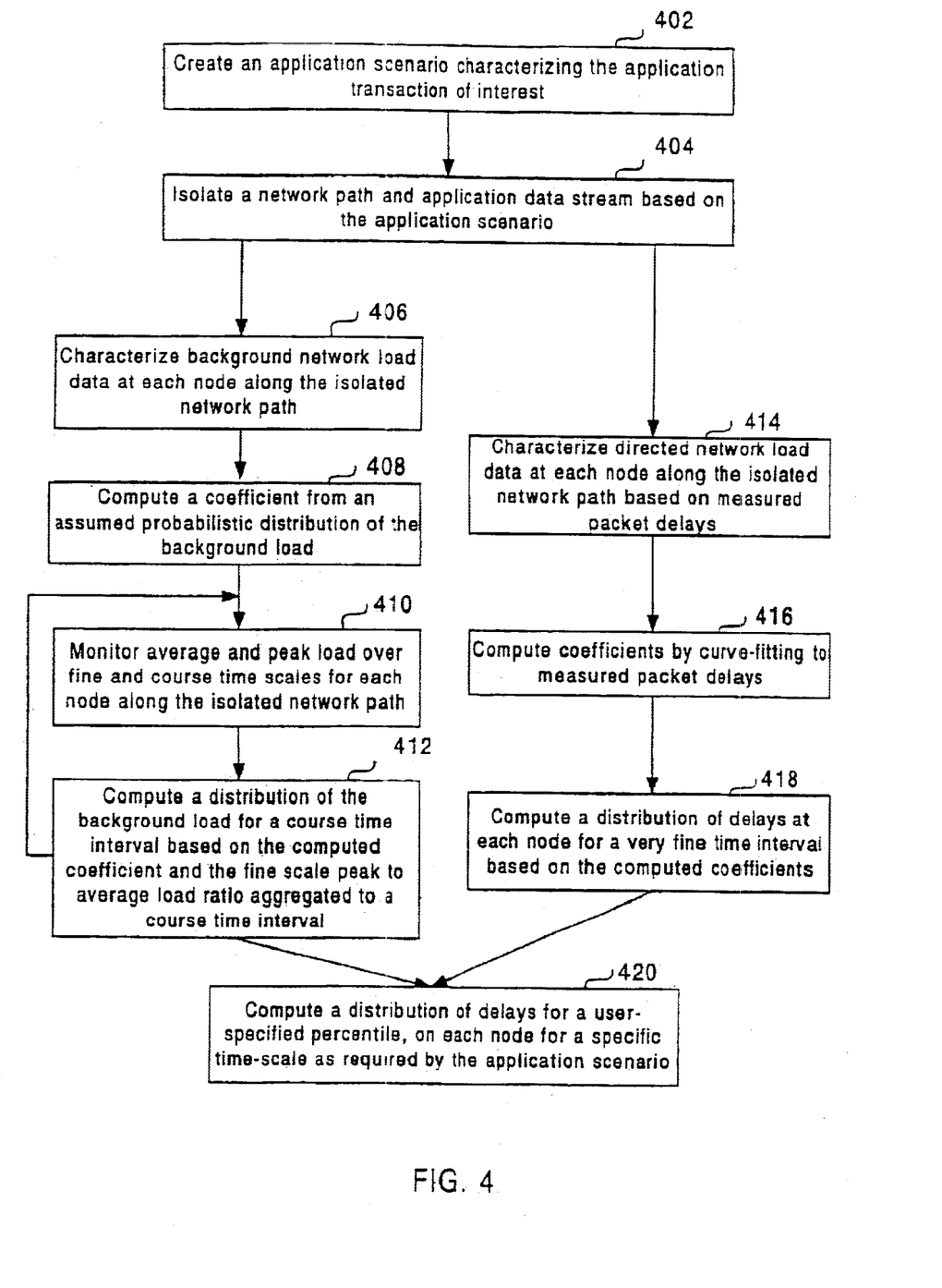
FIG. 4 is a flowchart depicting generally a method of operation 400 for adaptation of a network performance model, in accordance with an embodiment of the present invention.

FIG. 4 is a flowchart depicting generally a method of operation 400 for adaptation of a network performance model, in accordance with an embodiment of the present invention. At step 402, an application scenario characterizing a distributed application transaction is created through operation of the scenario module 326, as described above in reference to FIG. 3. At step 404, a network path is isolated and a stream of data packets is configured based on the application scenario. At step 406, the background network 102 (FIG. 1) load data is characterized at each node along the isolated network path of interest. Characterization of the background load includes collection of load data by the data capture engine 312 in conjunction with the monitoring engine 316 (FIG. 3) and/or reception of user-specified load data through the user interface module 222 (FIG. 2). The term "background" load is defined as the load on the network 102 due to the use of the network 102 by all other users, and may be modeled as a CCDF that varies as a function of the average value. The background load is in contrast to the "directed" load, defined as the load caused by the particular packet data stream of the application transaction that is being analyzed, and may be modeled in detail down to the level of packet inter-arrival times. Load probability distributions are utilized to accurately portray the composition of the network traffic in the associated network 102 path, are persistent over time, and are able to be characterized by functions whose parameters are obtainable by fits to measured data.

Step 408 of FIG. 4 depicts the step of computing a coefficient from an assumed probabilistic distribution of the background load. Preferably, a log-uniform probability distribution is utilized to provide accurate results over a wide range of load conditions. By analysis of data from many networks, it has been found that the probability distribution for background load on a given node is well expressed by the following function:

$$L(p) = L_{peak} e^{-b \cdot p};$$

where p is the CCDF percentile probability. The predicted average load value is constrained to equal the measured load value, thus:

$$L_{avg} = L_{peak} * [(1 - e^{-b})]/b.$$

Computation of b may be performed by solving the following equation utilizing a Newton-Raphson iterative solution:

$$e^{-b} = 1 - b/R;$$

where $R = L_{peak}/L_{avg}$, and $R \geq 1$ and $b \geq 0$. R may be obtained from a user input into the prediction engine 318, or by calibration to measured data.

As previously described, the monitoring engine 316 operates to monitor the prediction engine 318 calculations, request fine time-scale load data from the data capture module 312, and recompute R based on this fine time-scale load data, for on-line calibration of the load distribution model. In addition, the calibration engine 220 (FIG. 2) of the network performance analyzer 216 (FIG. 2) operates to calibrate delay distributions from packet delay data, which is described in more detail below.

At step 410, the average load ($L_{avg}$) and the peak load ($L_{peak}$), and thus R, is monitored for each node along the isolated network 102 path, over a course time-scale, preferably on a 60-second basis. In addition, the average and peak loads over a fine time-scale, preferably on a second-by-second basis, are monitored for use by the monitoring engine 316. As discussed, the monitoring engine 316 utilizes this data to monitor the probability distribution calculations, and to occasionally calibrate the distributions to the measured data, if necessary.

This fine time-scale data can be aggregated into a course time-scale (for example, for a specific hour) by the monitoring engine 316 (FIG. 3), by computing the average and peak to average ratio for that specified hour. This data can be stored in the database 320 (FIG. 3). With the aggregated average and peak load data, and the coefficient describing the shape of the probability distribution curve, the load on any node in the path can be determined for a given percentile for a specified time-scale, for example, a one minute time-scale, as in step 412. Due to the finding that R is rather constant in a network 102, load distribution conditions can be predicted based on user-specified or projected average load conditions.

At step 414, directed network 102 (FIG. 1) load data is characterized at each node along the isolated network 102 path by the calibration engine 220 (FIG. 2), based on measured data packet delays, to determine the variability in delay for individual packets. Analysis of fine time-scales reveals the sequence of individual packets and block size information that is useful in the simulation of application performance. Further analysis also reveals packet inter-arrival time as a function of packet size and the minimum packet inter-arrival time for a fixed packet size, thus providing valuable data from which the scenarios in the prediction engine 318 (FIG. 3) can be calibrated, preferably off-line.

In a preferred embodiment, the applicable time scale for the packet inter-arrival data is on the order of 100 ms, to characterize the burstiness of the network 102 (FIG. 1) performance. The burstiness over an appropriate time-scale characterizes the behavior of the distributed application, its impact on the network and its susceptibility for causing packet losses. This packet data is plotted and coefficients are computed by curve-fitting to the plotted data, step 416. The delay is approximated, step 418, by the following equation:

$$d(p)=d_{min}*e^{b*p};$$

where both b and $d_{min}$ are determinable from the fitting function. In networks wherein the packet data is not available, a default value for $d_{min}$ can be computed from the device capacity model 308. The delay distribution for the background load data is computable from the following equation:

$$d(p)=d_{min}/L(p).$$

Where both course load data and packet data are available, a delay distribution for a user-specified percentile, on each node for a specific time-scale required by the application scenario, is computable by the prediction engine 318 (FIG. 3) by superimposing, or summing the different time-scale delay distributions representing both the background and directed load data, at step 420.

Figure 5:
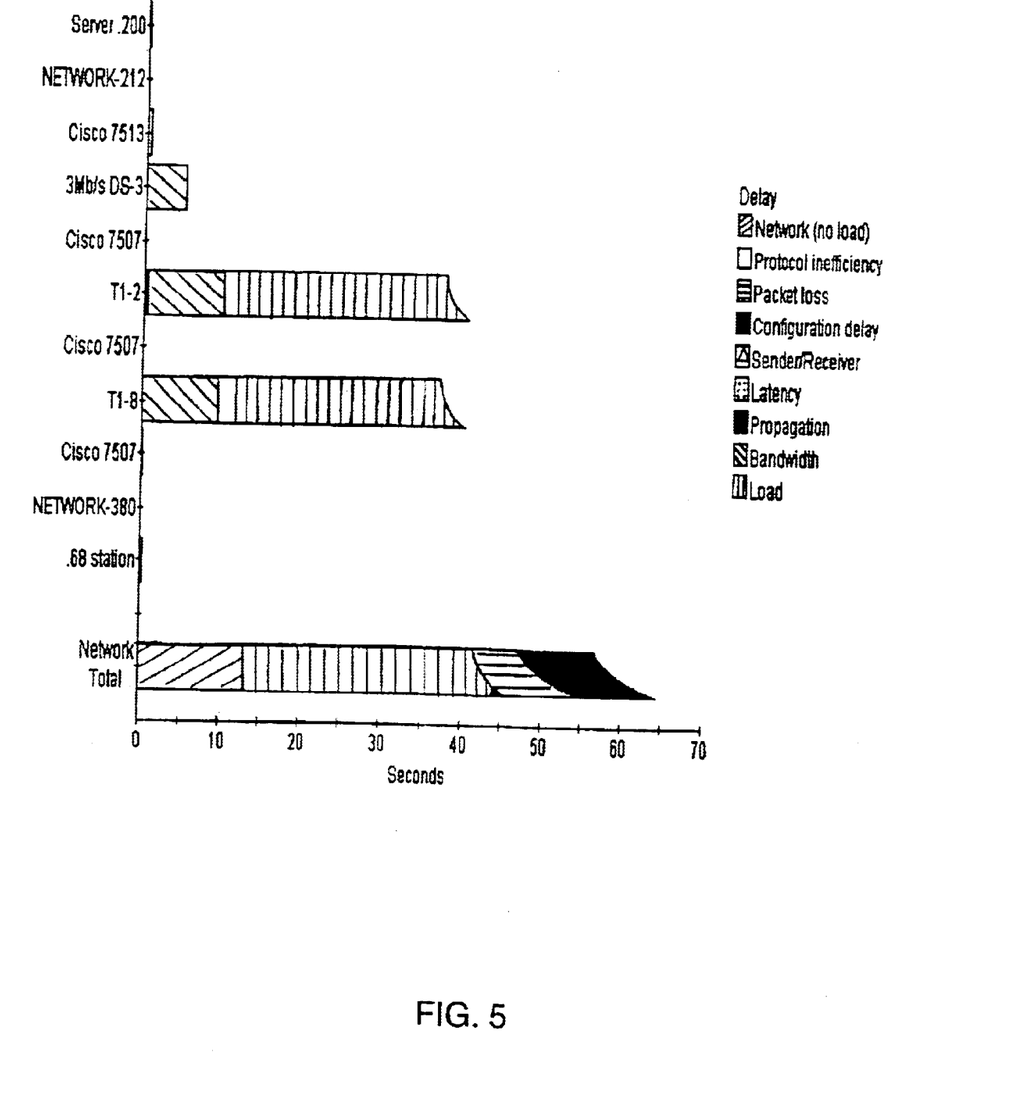
FIG. 5 depicts an exemplary graphical presentation that can be produced by the system and methods for adaptation of a network performance model, in accordance with an embodiment of the present invention.

FIG. 5 depicts an exemplary graphical presentation, or a delay CCDF, that can be produced by the system and methods for adaptation of a network performance model described herein. This type of display presents the expected delay for a specified application transaction or series of transactions, delineated by the delays attributable to various network 102 (FIG. 1) components. In addition, this type of graphical display may be augmented with percentile markings to signify the amount of delay that could be expected a specified percent of the time for the transaction and/or component of interest.

Figure 6:
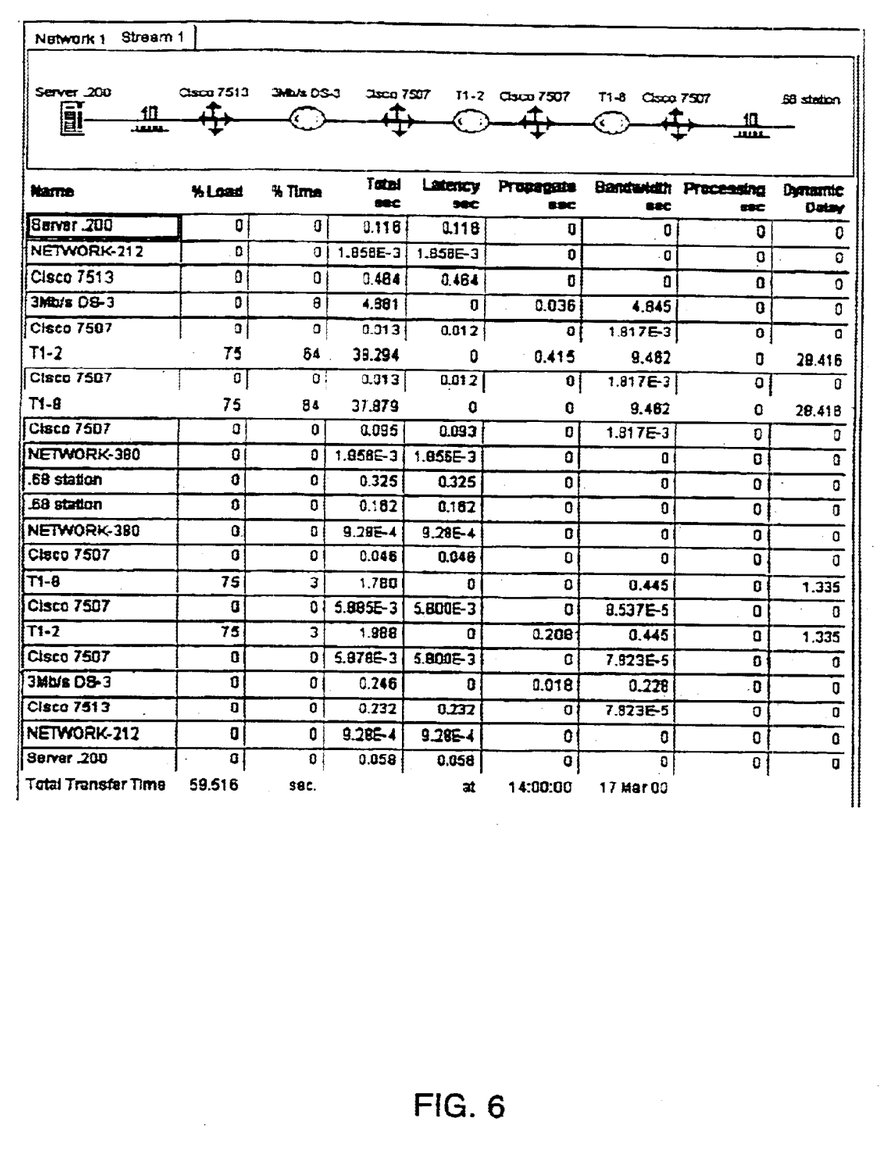
FIG. 6 depicts an exemplary tabular presentation that can be produced by the system and methods for adaptation of a network performance, in accordance with an embodiment of the present invention.

FIG. 6 depicts an exemplary tabular presentation that can be produced by the system and methods for adaptation of a network performance model described herein. This type of display also presents the expected delay for a specified application transaction or series of transactions, delineated by the delays attributable to various network components. Additional data is presented that is valuable to interested parties, for example, the percent load of the various network 102 (FIG. 1) components, the percent of the time that the component is at that percent load, and the total delay in seconds attributable to that network 102 component.

It will be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A method for adaptation of a network performance model, comprising the steps of:
   characterizing a load on a network, wherein the step of characterizing the load further comprises obtaining real network load data from a network;
   deriving a probabilistic distribution of the load, wherein the step of deriving the probabilistic distribution further comprises deriving a probabilistic distribution of a background load component, the background load component comprising a sampling of loads resulting from use of the network, and deriving a probabilistic distribution of a directed load component, the directed load component comprising data packet streams exchanging on the network related to execution of an application; and
   calibrating the network performance model based on the probabilistic distribution, thereby adapting the model to accurately compute desired data.

2. The method of claim 1, wherein the directed load component comprises an application load component.

3. The method of claim 1, wherein the step of deriving a probabilistic distribution of a background load component further comprises:
   assuming a probabilistic distribution of the background load component;
   computing an assumed average load from the assumed probabilistic distribution of the background load component;
   constraining the assumed average load to equal an average of the real network load; and
   solving for a coefficient representative of the probabilistic distribution.

4. The method of claim 1, wherein the step of calibrating the network performance model further comprises integrating calibration input from a user.

5. The method of claim 1, further comprising the steps of:
   creating an application scenario, the application scenario being a sequence of packets characterizing a distributed application transaction executing on the network; and
   isolating a network path based on the application scenario;
   wherein the probabilistic distributions of the background and directed load components are derived for at least one network node in the isolated network path.

6. The method of claim 5, wherein directed load components comprise application load components.

7. A method for adaptation of a network performance model, comprising the steps of:

characterizing a load on a network;

deriving a probabilistic distribution of the load; and calibrating the network performance model based on the probabilistic distribution, thereby adapting the model to accurately compute desired data;

wherein the step of calibrating the performance model further comprises monitoring a real network load for a period of time, computing a peak-to-average load ratio for the real network load, and deriving another probabilistic distribution of the load based on the peak-to-average load ratio for adapting the network model to the real network load data.

8. The method of claim 7, wherein the step of calibrating the network performance model further comprises integrating calibration input from a user.

9. A method for adaptation of a network performance model, comprising the steps of:

characterizing a load on a network;

deriving a probabilistic distribution of the load;

calibrating the network performance model based on the probabilistic distribution, thereby adapting the model to accurately compute desired data; and deriving a probabilistic distribution of the delays associated with an application transaction;

wherein the probabilistic distribution of the delays is derived from combining a probabilistic distribution of the delays based on a background load component with a probabilistic distribution of the delays based on a directed load component, the background load component comprising a sampling of loads resulting from use of the network, the directed load component comprising data packet streams exchanging on the network related to execution of the application.

10. The method of claim 9, wherein the directed load component comprises an application load component.

11. The method of claim 9, wherein the step of calibrating the network performance model further comprises integrating calibration input from a user.

12. A method for adaptation of a network performance model, comprising the steps of:

characterizing a load on a network;

deriving a probabilistic distribution of the load;

calibrating the network performance model based on the probabilistic distribution, thereby adapting the model to accurately compute desired data; and deriving a probabilistic distribution of the delays associated with an application transaction;

wherein the probabilistic distribution of the delays is derived from a log-uniform probability distribution function.

13. The method of claim 12, wherein the step of calibrating the network performance model further comprises integrating calibration input from a user.

14. A method for adaptation of a network performance model, comprising the steps of:

characterizing a load on a network;

deriving a probabilistic distribution of the load;

calibrating the network performance model based on the probabilistic distribution, thereby adapting the model to accurately compute desired data;

deriving a probabilistic distribution of the delays associated with an application transaction; and replying to an interrogatory from a user, the interrogatory regarding the effects of modifying the network configuration, wherein the reply is based on the derived probabilistic distribution of the delays.

15. A method for adaptation of a network performance model, comprising the steps of:

characterizing a load on a network, wherein the step of characterizing the load further comprises obtaining real network load data from the network, the real network load data being collected by sending a query to the network;

deriving a probabilistic distribution of the load; and calibrating the network performance model based on the probabilistic distribution, thereby adapting the model to accurately compute desired data; and determining a load data sampling frequency based on a network sensitivity to the sampling frequency and an observed variability in the data.

16. A method for adaptation of a network performance model, comprising the steps of:

characterizing a load on a network;

deriving a probabilistic distribution of the load;

calibrating the network performance model based on the probabilistic distribution, thereby adapting the model to accurately compute desired data; and modeling network topology for determining a delay associated with network overhead.

17. The method of claim 16, wherein the step of modeling network topology further comprises simulating a transport protocol utilized by the network and simulating a capacity associated with each device in the network.

18. A network performance analyzer, comprising:

a data capture module, for collecting network load data;

a topology module, for creating a network performance model;

a statistical analysis engine, for performing a statistical analysis on the network load data;

a prediction engine, for creating a prediction of future performance of a network through application of the statistical analysis to the performance model; and a monitoring engine for comparing the network load data with the prediction;

wherein the monitoring engine is operative for requesting additional network load data from the data capture module, the additional network load data being collected more frequently than the network load data, and for computing a load ratio based on the additional network load data and supplying the computed load ratio to the statistical analysis engine.

19. The network performance analyzer of claim 18, further comprising a calibration module for calibrating the future performance of the network.

20. The network performance analyzer of claim 19, wherein the calibration module is configured to integrate input from a user.

* * * * *